(12) United States Patent
Elliott (10) Patent No.: US 7,965,460 B2
(45) Date of Patent: Jun. 21, 2011

(54) JERK DETECTION FOR DATA STORAGE DEVICE

(75) Inventor: Mark L. Elliott, Eden Prairie, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 140 days.

(21) Appl. No.: 12/544,539

(22) Filed: Aug. 20, 2009

(65) Prior Publication Data

US 2011/0043944 A1    Feb. 24, 2011

(51) Int. Cl.
*G11B 27/36* (2006.01)
(52) U.S. Cl. .............................. 360/31; 360/75; 324/212
(58) Field of Classification Search .................. None
See application file for complete search history.

(56) References Cited

U.S. PATENT DOCUMENTS

| | | | |
|---|---|---|---|
| 4,862,298 A | 8/1989 | Genheimer et al. | |
| 5,608,586 A | 3/1997 | Sri-Jayantha et al. | |
| 5,631,427 A | 5/1997 | Bridges | |
| 5,653,925 A | 8/1997 | Batchelder | |
| 6,799,139 B2 * | 9/2004 | Slates | 702/142 |
| 6,963,463 B2 | 11/2005 | Sri-Jayantha et al. | |
| 7,375,916 B2 | 5/2008 | Semba et al. | |
| 7,400,468 B2 | 7/2008 | Kang et al. | |
| 7,405,893 B2 | 8/2008 | Lim et al. | |
| 7,411,752 B2 | 8/2008 | Angelo et al. | |
| 7,417,823 B2 | 8/2008 | Lim et al. | |
| 7,605,998 B2 * | 10/2009 | Takaishi | 360/78.04 |
| 2003/0103287 A1 | 6/2003 | Agematsu | |
| 2005/0270685 A1 | 12/2005 | Dang et al. | |
| 2006/0012912 A1 | 1/2006 | Jeong | |
| 2006/0103963 A1 | 5/2006 | Adapathya et al. | |
| 2006/0139807 A1 | 6/2006 | Shimotono et al. | |
| 2008/0278841 A1 | 11/2008 | McKenzie et al. | |
| 2009/0168249 A1 | 7/2009 | McCaslin et al. | |
| 2010/0290153 A1 * | 11/2010 | Hampshire | 360/77.08 |

OTHER PUBLICATIONS

Yan, Peng, et al. "Servo Systems Design For Low Sample Rate Disk Drive Systems". ASME Information Storage and Processing Systems Conference, 2008. Jun. 16-17, 2008, Santa Clara, CA, USA. pp. 1-3.
Micro House PC Hardware Library vol. I: Hard Drives: Hard Disk Drives. (n.d.). Retrieved Aug. 17, 2009 from http://www.alasir.com/books/hards/019-022.html. pp. 1-3.

* cited by examiner

*Primary Examiner* — Jason C Olson
(74) *Attorney, Agent, or Firm* — Brian R. Morrison; Westman, Champlin & Kelly, P.A.

(57) ABSTRACT

A device comprising at least one sensor configured to sense disturbances applied to the data storage device and to generate signals based on the sensed disturbances, and a controller configured to receive the signals from the at least one sensor and to detect jerk events in the sensed disturbances based at least in part on vector differentials of the received signals.

22 Claims, 6 Drawing Sheets

JERK DETECTION FOR DATA STORAGE DEVICE

BACKGROUND

The present disclosure is directed to devices, such as data storage devices. In particular, the present disclosure is directed to systems and processes for detecting vibration noise and jerk events in data storage devices.

Disturbances applied to data storage devices, such as vibrations and jerk events, are factors that can negatively impact the performance of such devices such. Vibrations, such as rotational vibrations, are caused by internal events such as drive-seeking energy amplified through the cabinet dynamics, and by cross-talk events such as seeking energy of adjacent drives, cabinet fans, and external vibrations. Such vibrations can disrupt the position of a transducing head, which can adversely affect the ability of a servo system to maintain the transducing head on-track during track following operations.

In comparison, jerk events are typically sudden events that can occur suddenly, and can occur from a variety of sources, such as by hot plugging the storage device, opening and closing cabinet doors, bumping or hitting the storage device, and the like. Due to their nature, jerk events produce high-frequency signals and may exhibit enough force to knock a transducing head off track, which can be particularly problematic during writing operations. As such, there is an ongoing need for increased advanced warnings of jerk events, thereby reducing the risk of off-track writing due to the occurrence of these events.

SUMMARY

A first aspect of the present disclosure is directed to a device that includes sensor(s) configured to sense disturbances applied to the device and to generate signals based on the sensed disturbances. The data storage device also includes a controller configured to receive the signals from the sensor(s) and to detect jerk events in the sensed disturbances based at least in part on vector differentials of the received signals.

Another aspect of the present disclosure is directed to a device that includes a controller configured to receive signals relating to disturbances applied to the device. The data storage device also includes a jerk detection algorithm implemented by the controller, where the jerk detection algorithm is configured to compare vector differentials of the received signals to at least one amplitude threshold value to detect jerk events in the sensed disturbances.

Another aspect of the present disclosure is directed to a method for detecting a jerk event applied to a device. The method includes receiving sampled signals relating to disturbances applied to the device, where the received sampled signals defining a signal wave, and determining a vector differential between a first signal and a second signal of the received sampled signals, where the first signal and the second signal are offset by an average number of received sampled signals per phase of the signal wave. The method also includes comparing the vector differential to a threshold value to detect the jerk event in the disturbances applied to the device.

Another aspect of the present disclosure is directed to a data storage device that includes at least one sensor configured to sense disturbances applied to the data storage device and to generate signals based on the sensed disturbances, and a controller configured to receive the generated signals from the at least one sensor. The data storage device also includes a jerk detection algorithm stored on a computer storage medium of the data storage device and implemented by the controller, where the jerk detection algorithm is configured to detect jerk events in the sensed disturbances based at least in part on vector differentials of the received signals.

DETAILED DESCRIPTION

The present disclosure is directed to a device, such as data storage device, that is configured to detect and compensate for jerk events applied to the data storage device. As discussed below, during operation, the data storage device senses applied disturbances, such as vibrations and jerk events, and applies a vector differential algorithm to isolate the high-frequency jerk events from the lower-frequency vibrations of the sensed disturbances. This provides advanced warnings of onset jerk events that may otherwise knock transducing heads off-track during writing operations. In response to a detected jerk event, the data storage device may halt writing operations to reduce the risk of overwriting or corrupting data in adjacent tracks.

Figure 1:
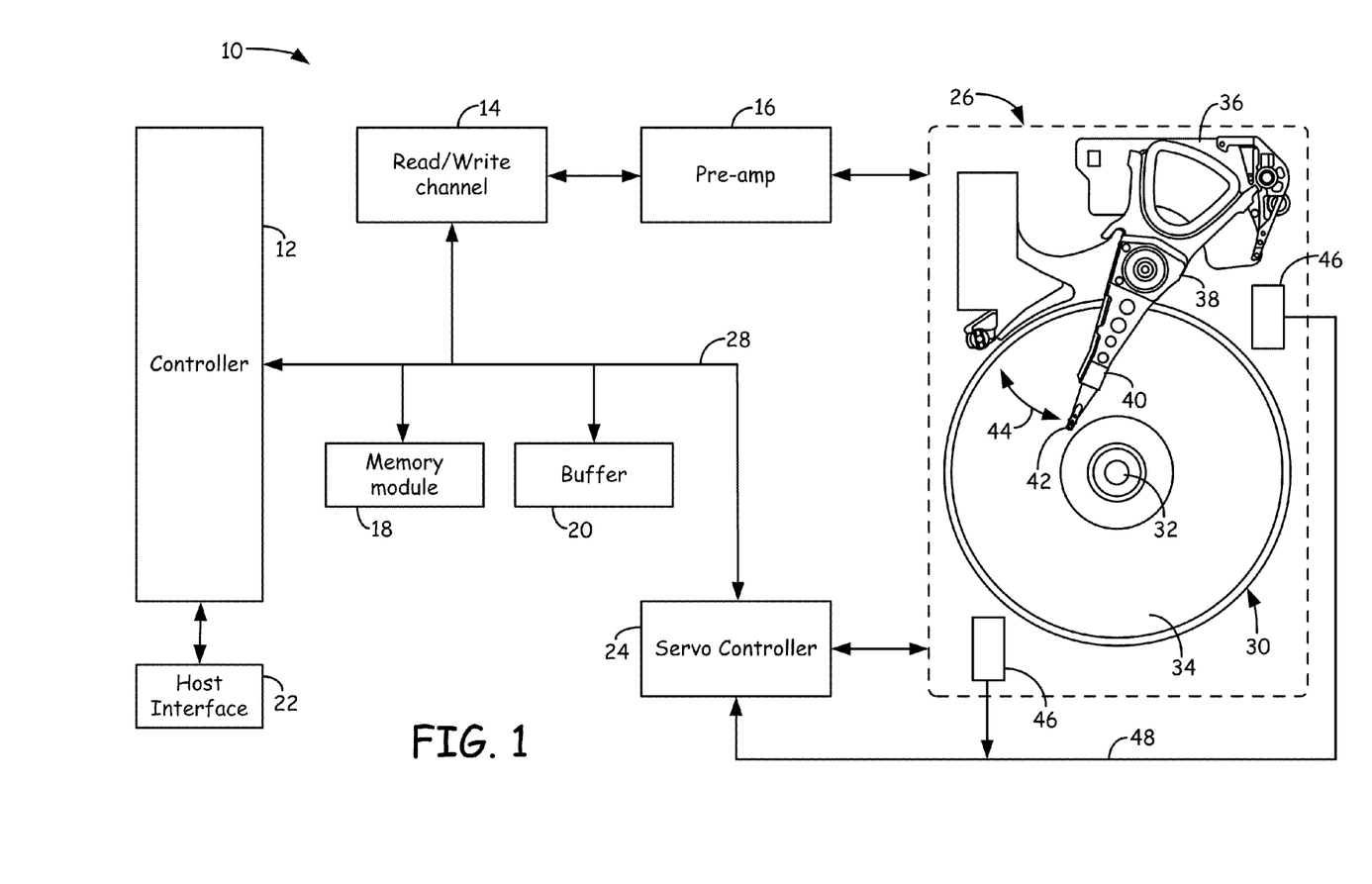
FIG. 1 is a schematic illustration of a data storage device of the present disclosure.

As shown in FIG. 1, storage device 10 is a data storage device (e.g., a hard disk drive) for storing and transferring digital data with a host computer system (not shown), and may operates with the above-mentioned vector differential algorithm. As shown, storage device 10 includes controller 12, read/write channel 14, pre-amplifier 16, memory module 18, buffer 20, host interface 22, servo controller 24, and head disk assembly (HDA) 26. As further shown, controller 12, read/write channel 14, memory module 18, buffer 20, and servo controller 24 may communicate with each other over communication line 28. While illustrated as a single data line, communication line 28 may alternatively include one or more interconnected or separate data lines configured to allow one or more of the components of storage device 10 to communicate with each other. The components of storage device 10 are also desirably retained with a housing of storage device 10 (not shown). Accordingly, storage device 10 may be internal or external to a casing of the host computer system.

In the shown embodiment, controller 12 is a microprocessor assembly configured to direct read and write commands for storage device 10. Controller 12 manages data transfers between host interface 22 and HDA 26 with the use of read/write channel 14 and pre-amplifier 16. Read/write channel 14 is a circuit configured to covert data between digital signals processed by controller 12 and analog signals of HDA 26.

Pre-amplifier 16 is disposed between read/write channel 14 and HDA 26 and is configured to amplify read and write signals transmitted between read/write channel 14 and HDA 26.

Memory module 18 is one or more non-volatile memory modules (e.g., flash memory) for storing information such as firmware. Buffer 20 is one or more volatile memory modules (e.g., dynamic random access memory) that may function as a data buffer during reading and/or writing operations with HDA 26. Controller 12 may communicate with the host computer system via host interface 22, where host interface 22 may be any suitable interface, such as a universal serial bus (USB) interface, a Serial Advanced Technology Attachment (SATA) interface, an External SATA (eSATA) interface, a Parallel Advanced Technology Attachment (PATA) interface, an IEEE 1394 interface, a Small Computer System Interface (SCSI), a Serial Attached SCSI (SAS) interface, an Integrated Drive Electronics (IDE) interface, a Fiber Channel interface, and the like.

Servo controller 24 is a second microprocessor assembly configured to direct seek and track following operations with HDA 26 based on commands from controller 12. While shown as separate microprocessor assemblies, in an alternative embodiments, the functions of controller 12 and servo controller 24 may be performed with a single microprocessor assembly. In the shown embodiment, servo controller 24 may manage a servo feedback loop and a vibration feedforward loop for HDA 26, where the vibration feedforward loop may be used to detect disturbances applied to storage device 10, such as vibrations and jerk events. This allows servo controller 24 to detect and compensate for onset jerk events that may otherwise cause off-track writing in HDA 26.

HDA 26 includes storage disk 30 and spindle hub 32, where spindle hub 32 is connected to a spindle motor of storage disk 30 (not shown) that is operated by servo controller 24. This arrangement allows servo controller 24 to rotate storage disk 30 during operation based on commands from controller 12. Storage disk 30 includes recordable surface 34, which is a surface of storage disk 38 having one or more recordable regions. In the shown embodiment, recordable surface 34 includes an embedded servo arrangement. In this embodiment, recordable surface 34 is divided into multiple sectors of concentric data tracks, where each sector is separated by a radial servo wedge containing servo data (e.g., gray code information).

HDA 26 also includes actuation motor 36 (e.g., a voice coil motor), actuator arm 38, suspension assembly 40, and slider 42, where slider 42 carries a transducing head (not shown). Slider 42 is supported by suspension assembly 40, which in turn is supported by actuator arm 38. In the shown embodiment, actuation motor 36 is also controlled by servo controller 24. Based on commands from servo controller 24, actuation motor 36 pivots actuator arm 38 about an axis in order to sweep suspension assembly 40 and slider 42 in an arc across recordable surface 34 (represented by arrow 44). An additional microactuation system (not shown) may also be used to produce precise, small-scale movements of suspension assembly 40 and slider 42. As slider 42 moves across recordable surface 34, the transducing head carried by slider 42 is desirably positioned relative to selected data tracks located on recordable surface 34. This allows the transducing head to write data to, and read from, the data tracks on recordable surface 34 during operation.

During a write operation, servo controller 24 directs actuation motor 36 to move the transducing head to an intended track of recordable surface 34. During this seek operation, the transducing head reads servo information retained in the servo wedges to find the intended track. When the intended track is reached, the servo information is then used in a track following operation to keep the transducing head substantially aligned with the center of the data tracks. This may be performed with a servo feedback loop in which the transducing head samples the servo information and transmits a read signal to pre-amplifier 16 and read/write channel 14. The read signal is amplified in pre-amplifier 16 and converted to digital data in read/write channel 14. Read/write channel 14 desirably extracts the servo information from the read signal and transmits the servo information to servo controller 24 over communication line 28. Servo controller 24 then uses the servo information and logical block addresses from controller 12 to seek the transducing head to an addressed track on recordable disk 34. As discussed above, this attempts to keep the transducing head aligned with the center of the data tracks during track following operations.

In an ideal environment in which no vibrations or jerk events are present, the servo feedback loop may be sufficient for keeping the transducing head centered on-track. However, as discussed above, the transducing head on slider 42 may be subjected to disturbances, such as vibrations and jerk events, that can knock the transducing head off-track. This can be problematic during reading and writing operations, particularly during writing operations where data in adjacent tracks may be overwritten or corrupted.

The servo sampling rate generally increases by the square root of tracks-per-inch density to reduce the risk of off-track writing between servo samples, which is referred to as single-wedge off-track writing. Higher servo sampling rates, however, require an increased number of servo wedges in recordable surface 34, thereby reducing the format efficiency of storage disk 30 (i.e., the ratio of data area to servo area). The reduced format efficiency correspondingly requires higher data rates and bits-per inch (BPI). However, increased BPI increases the bit error rate of storage device 10, which reduces production yields and read/write design margins. As such, there is an effective limit to the attainable servo sampling rate for data storage devices, such as storage device 10.

Furthermore, because the servo sampling is based on a feedback loop, it corrects the positioning of the transducing head after the misalignment is detected. This limitation of the servo sampling rate poses a potential issue for data storage devices when subjected to vibrations and jerk events. To detect and compensate for such disturbances, storage device 10 also includes sensors 46, each of which is a sensor (e.g., an accelerometer) configured to detect disturbances applied to storage device 10, such as vibrations and jerk events, and to transmit corresponding signals over communication line 48 to servo controller 24 in a feedforward loop. While shown with two sensors 46 disposed on HDA 26, storage device 10 may include any suitable number of sensors 46, which may be located at a variety of locations on storage device 10 (e.g., on HDA 26, circuit boards, housings, and the like).

Figure 2:
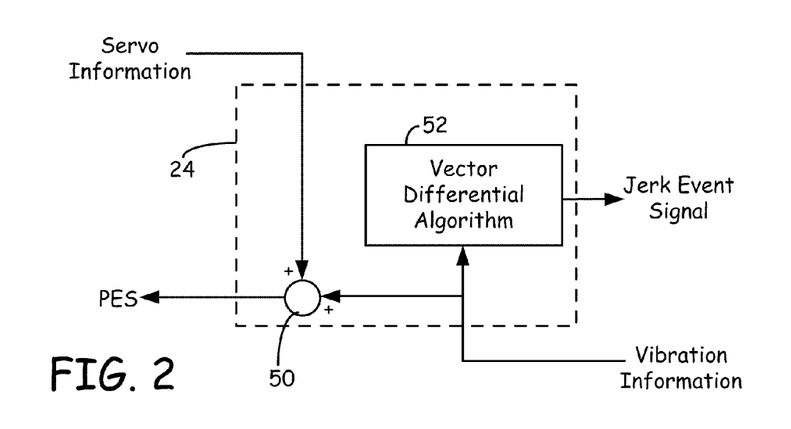
FIG. 2 is a schematic illustration of a feedback loop and a feedforward loop of the data storage device.

FIG. 2 is a schematic illustration of the feedback and feedforward loops of storage device 10. As discussed above, servo controller 24 receives servo information from read/write channel 14 to correct the position of the transducing head. To account for vibrations applied to storage device 10, the servo information sampled from the servo wedges in recordable surface 34 is combined with vibration information transmitted from one or more of sensors 46, as shown by summing operation 50. A position error signal (PES) may then be transmitted to controller 12 and/or read/write channel 14 to correct the position of the transducing head. This is arrangement is suitable for detecting and compensating low-frequency vibrations. For example, when the PES is greater than a fixed amount, controller 12 and/or read/write channel 14 may terminate writing operations.

However, high-frequency jerk events may occur quickly and suddenly, and can occur between servo samples. To account for these jerk events, servo controller 24 also includes vector differential algorithm 52, which is an algorithm configured to isolate the high-frequency jerk events from the lower-frequency vibrations, thereby allowing servo controller 24 to detect the jerk events with sufficient advanced warning. Consequentially, the jerk event detection augments the servo feedback loop by predicting when off-track writing will occur.

Vector differential algorithm 52 may be a software routine stored on a computer storage medium (e.g., memory module 18 and/or buffer 20) and that is performed by servo controller 24 and/or controller 12. This arrangement allows storage device 10 to perform the algorithm by modifications to its firmware, without requiring hardware changes. Vector differential algorithm 52 may be used to calculate vector differentials of the signal samples received from sensors 46 to isolate the high-frequency jerk events from the lower-frequency vibrations without incurring phase losses and time delays that may otherwise occur with the use of signal filters. If a jerk event is detected, then servo controller 24 may transmit a jerk event signal to controller 12 and/or read/write channel 14 to instruct the transducing head of HDA 26 to halt writing operations for a predetermined period of time. This reduces the risk of overwriting or corrupting data in adjacent tracks if the transducing head is knocked off-track from the jerk event.

The combination of the feedforward loop with sensors 46 and the servo feedback loop provides a multi-rate event detection system that is capable of detecting and compensating for both lower-frequency vibrations and high-frequency jerk events that occur during operation of storage device 10. This is in comparison to conventional PES and jerk detection systems, which are typically sampled at the same time to reduce the probability of off-track writing (i.e., single-rate systems). Storage device 10, however, is capable of sampling sensor(s) 46 two or more times between each PES sample to provide a multi-rate event detection system, which can provide faster off-write protection than is otherwise capable with a single-rate system. In some embodiments, the sampling of sensor(s) 46 may alternatively be performed asynchronously with the PES sampling.

Figure 3:
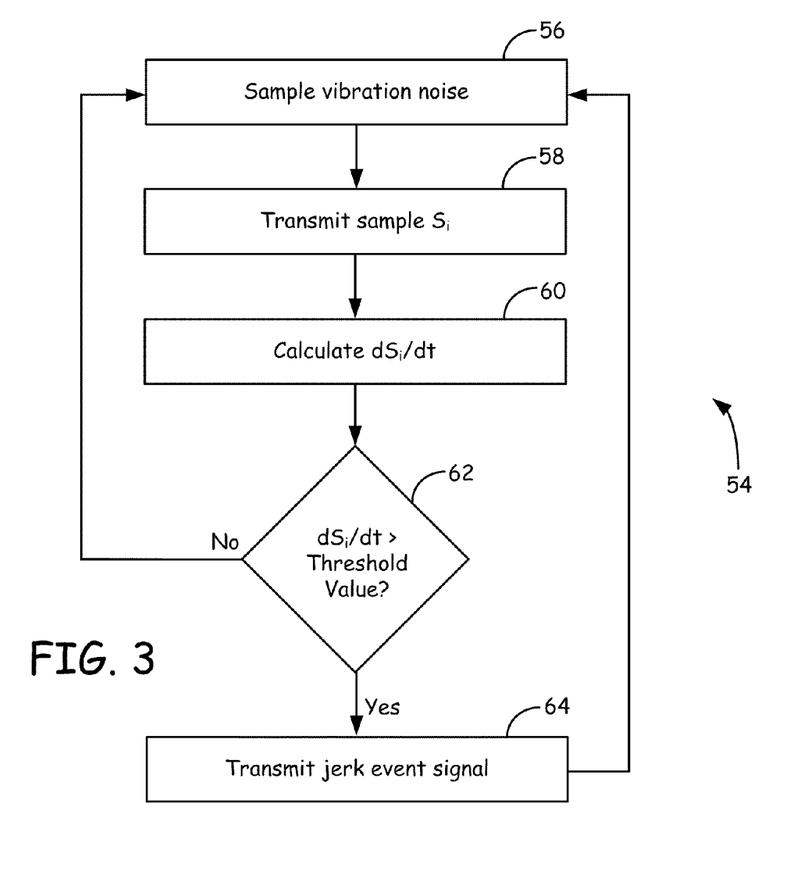
FIG. 3 is a flow diagram of a method for detecting jerk events from sensed disturbances applied to data storage devices.

FIG. 3 is a flow diagram of method 54 for performing a vector differential algorithm with a data storage device. The following discussion of method 54 is made with reference to storage device 10 with the understanding that method 54 is suitable for use with a variety of different data storage devices. As shown, method 54 includes steps 56-64, and initially involves sampling vibrations applied to storage device 10 with at least one of sensors 46 (step 56). Vibrations are typically lower-frequency events that can be continuously sensed by sensors during operation of storage device 10. For example, sensors 46 may sense rotational vibrations induced by the drive-seeking energy amplified through the cabinet dynamics. Based on the sensed vibrations, sensor 46 may transmit a signal to servo controller 24 relating to the sampled vibrations (referred to as sample $S_i$) (step 58). As discussed below, upon receipt of sample $S_i$, servo controller 24 may then calculate a vector differential for sample $S_i$ ($dS_i/dt$) (step 60), and may compare the vector differential to a threshold value that signifies a potential jerk event (step 62).

If the vector differential is not greater than the threshold value, no jerk event is detected and servo controller 24 continues to monitor subsequent samples. However, if the vector differential is greater than the threshold value, this signifies that a jerk event has occurred. As such, servo controller 24 may then transmit a jerk event signal to controller 12 and/or read/write channel 14 to halt writing operations for a predetermined period of time (step 64). This reduces the risk of overwriting or corrupting data in adjacent tracks if the transducing head is knocked off-track from the jerk event. Steps 56-64 may then be repeated during the operation of storage device 10 to continue to detect and compensate for subsequent jerk events. As discussed below in FIGS. 4-6, the vector differentials effectively function as threshold baselines that follow the signal wave of the sampled vibrations, thereby effectively cancelling the signals of the lower-frequency vibrations while searching for higher-frequency samples that may signify jerk events.

Figure 4:
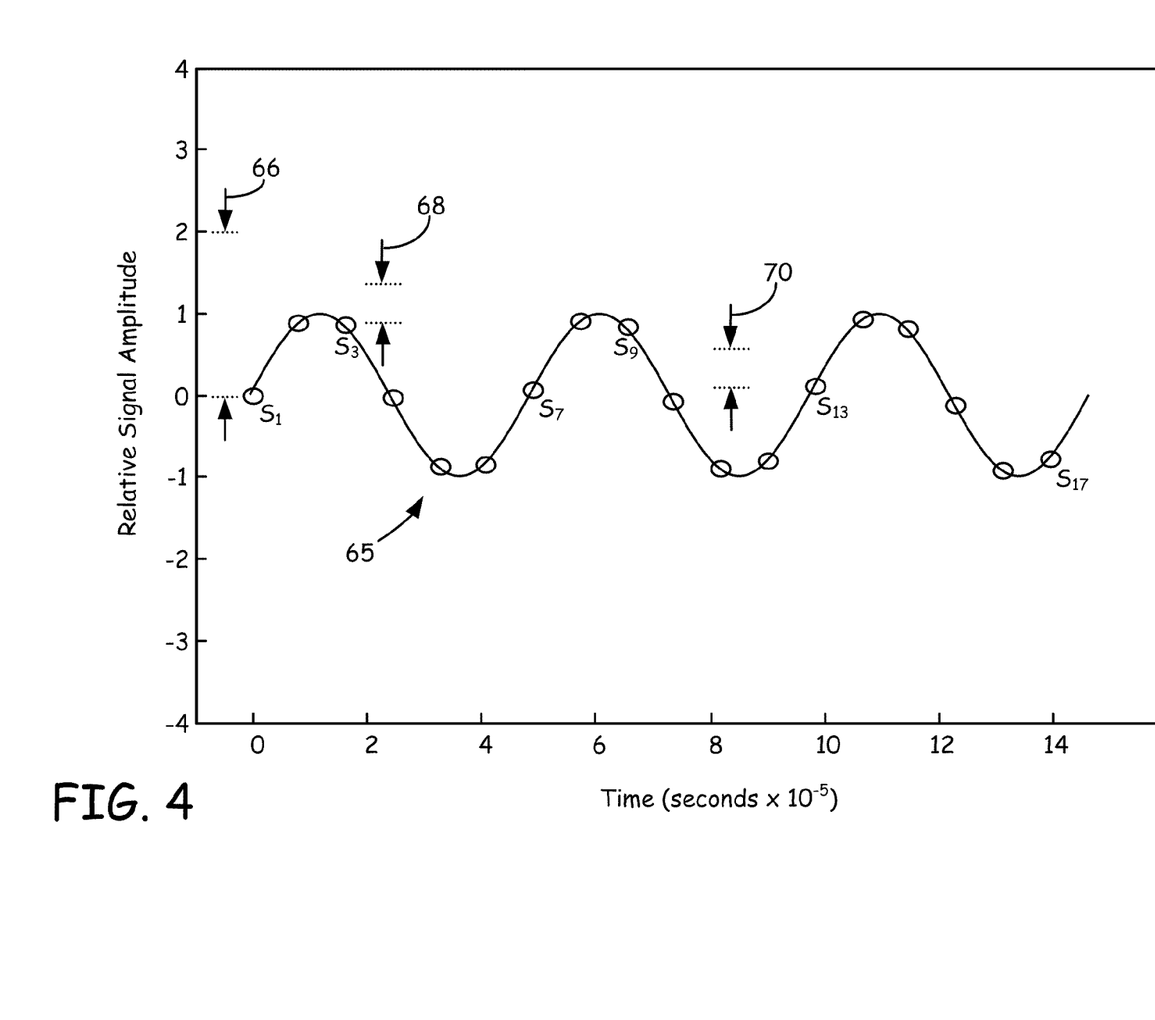
FIGS. 4-6 are graphical illustrations of signal waves derived from sensed vibration and jerk event signals, illustrating the method for detecting jerk events.
Figure 5:
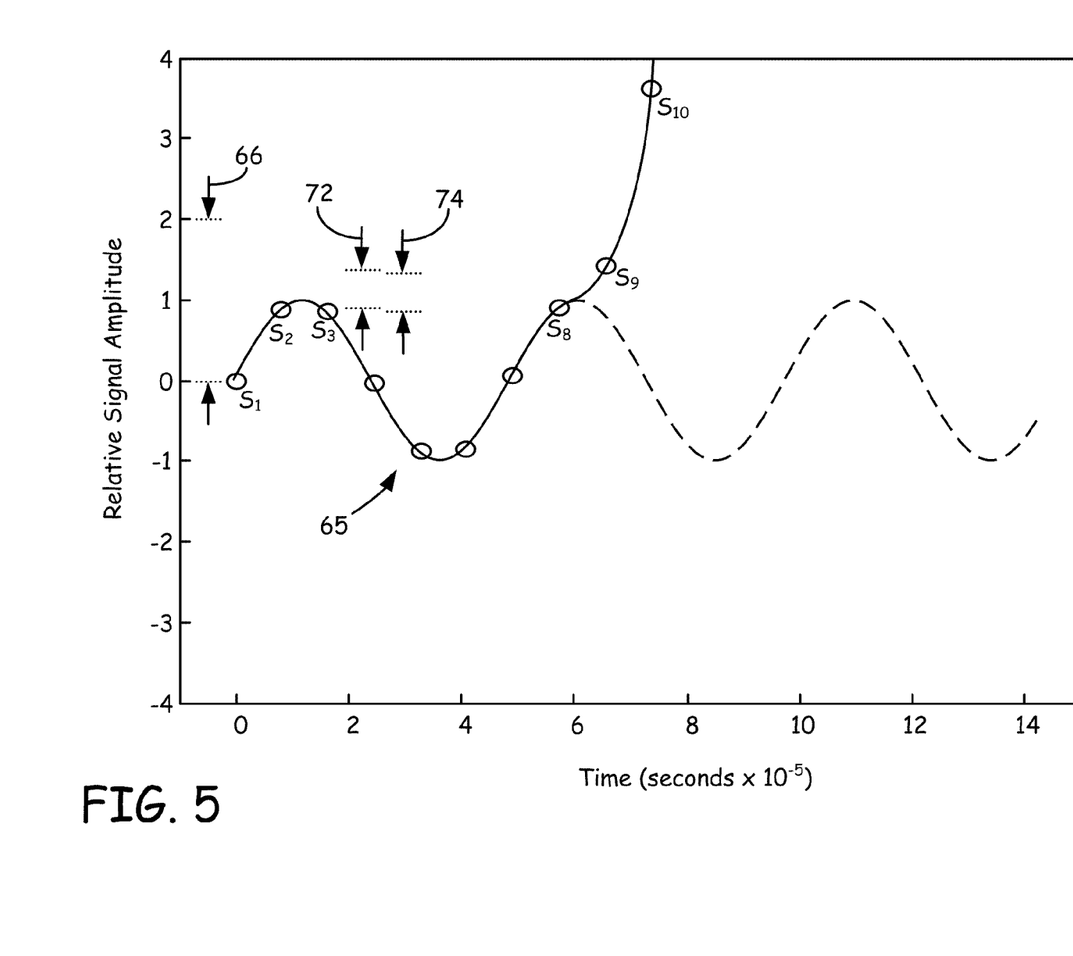
Figure 6:
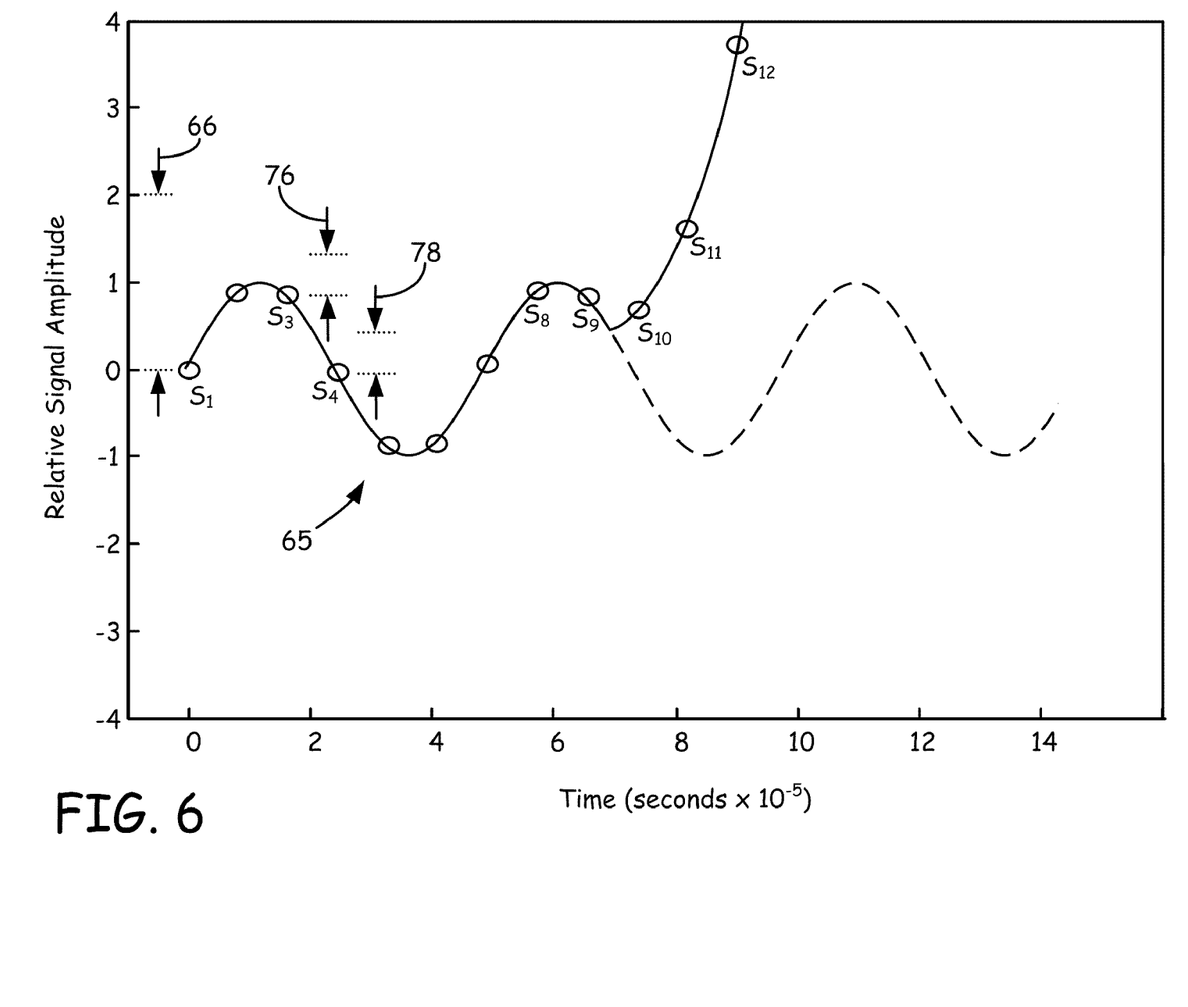

FIGS. 4-6 are graphical illustrations of signals received by servo controller 24 from one of sensors 46 with a sensor sampling frequency of about 120 kilohertz (kHz). FIG. 4 illustrates a situation in which sensor 46 detects vibrations having a signal wave frequency of about 20 kHz, and FIGS. 5 and 6 illustrate situations in which sensor 46 also detects jerk events at different phases along the vibration signal wave (referred to as signal wave 65). For ease of discussion, the read samples shown in FIGS. 4-6 are referred to as samples $S_1$-$S_{17}$ and are used throughout the discussions of FIGS. 4-6. Furthermore, the following discussion is made with reference to samples attained with a single sensor 46. However, storage device 10 desirably includes multiple sensors 46 to detect disturbances applied to various locations of storage device 10. As such, servo controller 24 may apply the vector differential algorithm to samples attained from each sensor 46.

As shown in FIG. 4, the sampling of vibrations with sensor 46 provides samples (e.g., samples $S_1$-$S_{17}$) having amplitudes that vary over time in an oscillating manner to define signal wave 65. As discussed above, based on the detected vibrations, servo controller 24 may combined the servo information with the information relating to the vibrations to produce a PES to correct the position of the transducing head.

In addition, pursuant to steps 60 and 62 of method 54 (shown in FIG. 3), servo controller 24 may calculate vector differentials on the signals received from sensor 46 to detect high-frequency jerk events. This is in contrast to some conventional systems that incorporate signal filters and/or fixed thresholds. For example, some conventional systems incorporate a fixed signal amplitude threshold for detecting jerk events (referred to as fixed threshold 66). In these systems, fixed threshold 66 is typically fixed at a signal amplitude that is greater than the expected amplitudes of the vibration signals. However, the use of fixed threshold 66 is independent of the amplitudes of the vibration signals. As such, a jerk event occurring at the time of sample $S_1$ would take longer to be detected compared to a jerk event occurring at the time of sample $S_3$ due to the amplitude differences. This delay in detecting jerk events reduces the advanced warning that servo controller 24 has to respond to the jerk events. Other approaches to compensate for this issue include signal filters to block some frequencies of the vibrations (e.g., with a notch filter). However, signal filters typically induce phase losses and time delays, which may also reduce the advanced warning that servo controller 24 has to respond to jerk events.

Instead, servo controller 24 determines vector differentials for the signals received from each sensor 46, and compares the vector differentials to a threshold value. A vector differential for a sample $S_i$ ($dS_i/dt$) that is greater than the threshold value identifies a substantial amplitude change due to a jerk event, and may be represented by Equation 1:

$$dS_i/dt > \text{Threshold Value} \qquad \text{(Equation 1)}$$

In the event that the vector differential is greater than the jerk threshold, then servo controller 24 may transmit a jerk event signal to controller 12 and/or read/write channel 14 to halt writing operations for a predetermined period of time. This reduces the risk of overwriting or corrupting data in adjacent tracks if the transducing head is shifted off-track from the jerk event.

Implementation of the algorithm under Equation 1 may involve determining the vector differential over time between a current sample ($S_i$) and a previous sample taken n readings ago ($S_{i-n}$), where the value n is desirably set such that sample $S_i$ and sample $S^{i-n}$ are samples in successive phases of signal wave 65 and have substantially the same amplitudes. For example, as shown in FIG. 4, sample $S_7$ is in the successive phase of signal wave 65 from sample $S_1$, and samples $S_1$ and $S_7$ have substantially the same amplitudes. A similar comparison can be made for samples $S_3$ and $S_9$.

Vibrations applied to storage device 10 may occur with a substantially constant frequency, such that the successive phases of signal wave 65 may follow a regular pattern. In these situations, the value n may be determined as a ratio of the sampling frequency of sensor 46 to the average frequency of signal wave 65. Thus, samples $S_i$ and $S_{i-n}$ are desirably offset by an average number of signal samples per phase of signal wave 65. For example, for the noise signal wave shown in FIG. 4 having a frequency of about 20 kHz and with a sampling frequency of about 120 kHz, n may be preset to a value of six (i.e., the ratio of 120 kHz to 20 kHz), such that a current sample reading 5, and a previous sample reading $S_{i-6}$ are similar in amplitude. In alternative embodiments, the value n may be adaptable to substantially maintain the close matching of the phase amplitudes of signal wave 65. This embodiment is beneficial in situations where the signal wave 65 may vary over time.

Based on the value n, servo controller 24 may determine the vector differential for a current sample $S_i$, pursuant to Equation 2:

$$dS_i/dt = \text{Amplitude}(S_{i-n}) - \text{Amplitude}(S_i) \quad \text{(Equation 2)}$$

where Amplitude($S_{i-n}$) is the amplitude of sample $S_{i-n}$, and Amplitude($S_i$) is the amplitude of sample $S_i$. For example, for n=6, the vector differential for sample $S_9$ (i.e., $dS_9/dt$) is the amplitude difference between sample $S_3$ and sample $S_9$.

Servo controller 24 then compares the vector differential to the threshold value as discussed above for Equation 1. The threshold value may be a fixed value or may also adapt to the vibration signals. In one embodiment, the threshold value may be adaptive pursuant to the algorithms disclosed in Genheimer et al., U.S. Pat. No. 4,862,298. In this embodiment, the threshold algorithm may be used in combination with the vector differential algorithm disclosed herein. The threshold value may vary depending on the relative signal amplitudes received by servo controller 24. Examples of suitable values for the threshold value range from about a 5% change to about a 50% change, with particularly suitable values ranging from about a 10% change to about a 25% change, where the percentage change refers to the change in amplitude between the givens samples.

Combining Equations 1 and 2 provides another manner in which the comparison of the vector differential to the threshold value may be made, which is shown in Equation 3:

$$\text{Amplitude}(S_i) > \text{Amplitude}(S_{i-n}) + \text{Threshold Value} \quad \text{(Equation 3)}$$

Accordingly, if the amplitude of sample Si is greater than the sum of the amplitude of sample $S_{i-n}$ and the threshold value, this signifies a potential jerk event. For example, when sample $S_9$ is received, servo controller 24 may determine whether the amplitude of sample $S_9$ is greater than the amplitude of sample $S_3$ and the threshold value, which represented by threshold 68. In this case, the amplitude of sample $S_9$ is less than threshold 68. As such, no jerk event is detected and servo controller 24 continues to monitor subsequent samples.

Similarly, in another example, when sample $S_{13}$ is received, servo controller 24 may determine whether the amplitude of sample $S_{13}$ is greater than the amplitude of sample $S_7$ and the threshold value, which represented by threshold 70. In this case, the amplitude of sample $S_{13}$ is also less than threshold 70. As such, no jerk event is detected and servo controller 24 continues to monitor subsequent samples. Accordingly, the vector differential effectively functions as a threshold baseline that follows signal wave 65, thereby effectively cancelling the vibration signals while searching for higher-frequency samples that may signify jerk events.

FIG. 5 illustrates a situation in which a high-frequency jerk event occurs between samples $S_8$ and $S_9$. The high-frequency nature of a jerk event results in an amplitude curve have a steep leading edge. In this situation, when sample $S_8$ is received, servo controller 24 determines whether the amplitude of sample $S_8$ is greater than the amplitude of sample $S_2$ and the threshold value, which represented by threshold 72. In this case, the amplitude of sample $S_8$ is less than threshold 72. As such, no jerk event is detected and servo controller 24 continues to monitor subsequent samples.

However, when sample $S_9$ is received, servo controller 24 determines whether the amplitude of sample $S_9$ is greater than the amplitude of sample $S_3$ and the threshold value, which represented by threshold 74. In this case, the amplitude of sample $S_9$ is greater than threshold 74. Based on this determination, servo controller 24 then transmits a jerk event signal to controller 12 and/or read/write channel 14 to halt writing operations for a predetermined period of time. This reduces the risk of overwriting or corrupting data in adjacent tracks if the transducing head is shifted off-track from the jerk event.

The vector differential effectively functions as a threshold baseline that follows the wave pattern of signal wave 65. As such, the threshold value may be set at a lower amplitude compared to fixed threshold 66. This allows servo controller 24 to detect jerk events earlier than a controller operating with fixed threshold 66, while also reducing the risk of false detections of jerk events due to variations in the vibration signals. As shown, the amplitude of the jerk event exceeds threshold 74 prior to receiving sample $S_9$. As such, servo controller 24 is capable of detecting the jerk event at sample $S_9$. In comparison, the amplitude of the jerk event would not exceed fixed threshold 66 until sample $S_{10}$ is received, thereby reducing the advanced warning of the jerk event. Furthermore, under the vector differential algorithm, jerk events may be detected with servo controller 24 without the use of signal filters, which may incur phase losses and time delays.

FIG. 6 illustrates a jerk event that occurs between samples $S_9$ and $S_{10}$, which have lower amplitudes compared to samples $S_8$ and $S_9$. Accordingly, when sample $S_9$ is received, servo controller 24 determines whether the amplitude of sample $S_9$ is greater than the amplitude of sample $S_3$ and the threshold value, which represented by threshold 76. In this case, the amplitude of sample $S_9$ is less than threshold 76. As such, no jerk event is detected and servo controller 24 continues to monitor subsequent samples.

When sample $S_{10}$ is received, however, servo controller 24 determines whether the amplitude of sample $S_{10}$ is greater than the amplitude of sample $S_4$ and the threshold value, which represented by threshold 78. In this case, the amplitude of sample $S_{10}$ is greater than threshold 78. Based on this determination, servo controller 24 then transmits a jerk event signal to controller 12 and/or read/write channel 14 to halt writing operations for a predetermined period of time. This reduces the risk of overwriting or corrupting data in adjacent tracks if the transducing head is shifted off-track from the jerk event.

The examples shown in FIGS. 5 and 6 illustrate the benefits of using a threshold baseline that follows the wave pattern of the vibration signals (e.g., signal wave 65). This allows servo controller 24 to detect jerk events even when the read samples have amplitudes that are less than the peak amplitudes of the vibration signals. In comparison, fixed threshold 66 is required to exceed the peak amplitudes of the vibration signals to avoid false detections of jerk events. This, however, prevents the detection of jerk events until a read sample exceeds fixed threshold 66, which, in the current example, does not occur until sample $S_{12}$ is received.

Data storage devices incorporating the vector differential algorithm, however, have increased advanced warnings of onset jerk events that may otherwise knock transducing heads off-track during writing operations (e.g., from about 20 microseconds to about 200 microseconds of advanced warning). Furthermore, the vector differential algorithm is suitable for isolating high-frequency jerk events from lower-frequency vibrations without incurring false detections of jerk events due to small fluctuations in the signal waves of the vibrations (e.g., signal wave 65). Suitable disturbance frequencies that may be isolated and detected range from at least about 2 kHz, with particularly suitable disturbance frequencies ranging from about 20 kHz to about 500 kHz, and with even more particularly suitable disturbance frequencies ranging from about 50 kHz to about 150 kHz.

EXAMPLES

The present disclosure is more particularly described in the following examples that are intended as illustrations only, since numerous modifications and variations within the scope of the present disclosure will be apparent to those skilled in the art. A hard disk drive having firmware encoded with the vector differential algorithm of the present disclosure was tested for jerk event detections. The testing involved securing the hard disk drive to a surface, where the surface contained a first accelerometer at a location that was offset from the hard disk drive. The hard disk drive contained a second accelerometer, which was configured to communicate with the servo controller of the hard disk drive to monitor the feedforward loop.

Figure 7:
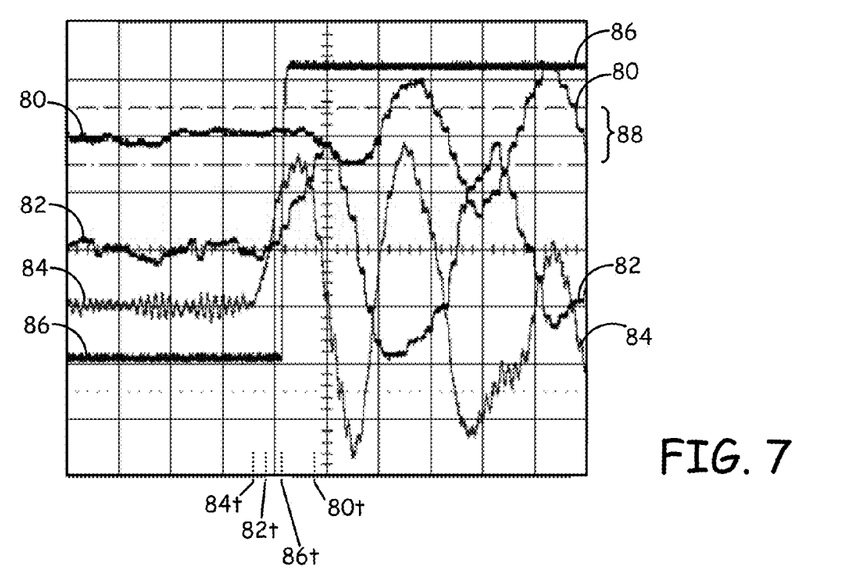
FIG. 7 is a graphical illustration of test results of a jerk event detected with a storage device of the present disclosure, where the jerk event is applied in along an x-axis of the data storage device.

FIG. 7 is a graphical illustration of signal amplitudes over time, and includes signal waves 80, 82, 84, and 86. Signal wave 80 is a recorded signal wave of the PES that is generated in the servo controller of the hard disk assembly. As shown in FIG. 7, to prevent off-track writing, the PES is desirably retained within amplitude region 88. Signal wave 82 is a recorded signal wave from the second accelerometer secured to the hard disk drive, where the second accelerometer detected vibrations and jerk events applied to the hard disk drive. Signal wave 84 is a recorded signal wave of the first accelerometer offset from the hard disk drive. Finally, signal wave 86 is a recorded signal wave of samplings from the servo controller to detect the transmission of a jerk event detection signal. Accordingly, a spike in signal wave 86 signifies that the servo controller detected a jerk event from the disturbances sensed with the second accelerometer secured to the hard disk drive.

A low-level impact of 8,100 g-forces/second was then applied to the surface adjacent to the first accelerometer. As such, the sharp increased amplitude of signal wave 84 at time point 84*t* generally signifies when the jerk event occurred. Signal wave 82 began to sharply increase in amplitude at time point 82*t*, which signifies the point at which the second accelerometer secured to the hard disk drive sensed the jerk event. The second accelerometer transmitted signals relating to sensed vibrations and the sensed jerk event to the servo controller, which compared the vector differentials of the received signals to a threshold value, as discussed above. Shortly after the second accelerometer sensed the jerk event, the servo controller transmitted a jerk event detection signal at time point 86*t*, as indicated by the amplitude spike in signal wave 86. This allowed the hard disk drive to halt writing operations for a period of time to prevent off-track writing due to the onset jerk event.

In comparison, the PES shown in signal wave 80 required a greater period of time to detect the jerk event, as indicated at time point 80*t*. Furthermore, the PES was not capable of correcting the position of the transducing head for a substantial period of time after the jerk event reaches the hard disk drive. This is shown by the increasing amplitudes of signal wave 80, which extend outside of amplitude region 88. As such, if the transducing head of the data storage device were writing data to data tracks of a storage disk, the jerk event would have knocked the transducing head over adjacent tracks, thereby potentially overwriting or corrupting data in the adjacent tracks.

However, the jerk event detection signal was transmitted with sufficient advanced warning to allow the controller and/or read/write channel to inhibit the transducing head from writing data for a set period of time. This prevented off-track writing when the transducing head was knocked off-track. In the results shown in FIG. 7, the transmission of the jerk event detection signal provided about 120 microseconds of advanced warning, even with the low-level impact applied to the surface. Additional tests were also performed with different levels of impact on the surface. The hard disk drive was capable of detecting jerk events for impact levels below even 6,000 g-forces/second.

The above-discussed tests were performed with the hard disk drive lying flat on the surface such that the surface and the storage disk were substantially parallel. This allowed the second accelerometer to directly detect vibrations and jerk events. In additional tests, however, the hard disk drive was positioned "on end" on the surface, such that the vibrations and jerk events were applied to the hard disk drive along an axis that was substantially perpendicular to the detection axis of the second accelerometer.

Figure 8:
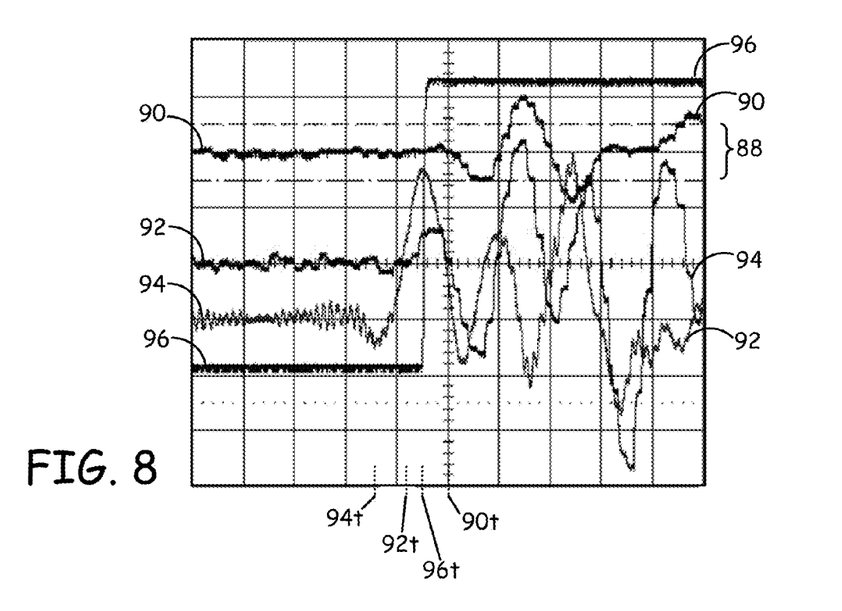
FIG. 8 is a graphical illustration of test results of a jerk event detected with a storage device of the present disclosure, where the jerk event is applied in along an z-axis of the data storage device.

FIG. 8 is a graphical illustration of signal amplitudes over time for this perpendicular arrangement, and includes signal waves 90, 92, 94, and 96, which respectively correspond to signal waves 80, 82, 84, and 86 (shown in FIG. 7). A low-level impact of 8,100 g-forces/second was again applied to the surface adjacent to the first accelerometer. As such, the sharp increased amplitude of signal wave 94 at time point 94*t* generally signifies when the jerk event occurred. Signal wave 92 began to sharply increase in amplitude at time point 92*t*, which signifies the point at which the second accelerometer secured to the hard disk drive sensed the jerk event. As shown, despite the perpendicular arrangement, the second accelerometer was capable of readily sensing the jerk event.

The second accelerometer transmitted signals relating to sensed vibrations and the jerk event to the servo controller, which compared the vector differentials of the received signals to a threshold value, as discussed above. Shortly after the second accelerometer sensed the jerk event, the servo controller transmitted a jerk event detection signal at time point

96t, as indicated by the amplitude spike in signal wave 96. This allowed the hard disk drive to halt writing operations for a period of time to prevent off-track writing due to the onset jerk event.

In comparison, the PES shown in signal wave 90 also required a greater period of time to detect the jerk event, as indicated at time point 90t, and the amplitudes of signal wave 90 also extended outside of amplitude region 88. As such, if the transducing head of the data storage device were writing data to data tracks of a storage disk, the jerk event would have knocked the transducing head over adjacent tracks, thereby potentially overwriting or corrupting data in the adjacent tracks.

As shown by the results in FIG. 8, however, the jerk event detection signal was transmitted with an advanced warning of about 100 microseconds. Accordingly, regardless of the sensor orientations relative to the jerk event sources (e.g., parallel and perpendicular arrangements), data storage devices of the present disclosure are capable of detecting jerk events with sufficient advanced warnings to inhibit writing operations, thereby preventing off-track writing.

Although the present invention has been described with reference to preferred embodiments, workers skilled in the art will recognize that changes may be made in form and detail without departing from the spirit and scope of the invention.

The invention claimed is:

1. A device comprising:
   at least one sensor configured to sense disturbances applied to the device and to generate signals based on the sensed disturbances; and
   a controller configured to receive the signals from the at least one sensor and to detect jerk events in the sensed disturbances based at least in part on vector differentials of the received signals.

2. The device of claim 1, wherein the controller is further configured to detect the jerk events in the sensed disturbances based on comparisons of the vector differentials to an amplitude threshold value.

3. The device of claim 1, wherein the received signals define a signal wave, and wherein the vector differentials comprise a difference in amplitudes between a first signal and a second signal of the received signals, the first signal and the second signal being in successive phases of the signal wave.

4. The device of claim 3, wherein the first signal and the second signal are offset by an average number of received signals per phase of the signal wave.

5. The device of claim 3, wherein the controller is further configured to detect at least one of the jerk events based on a comparison of the difference in amplitudes to an amplitude threshold value.

6. The device of claim 1, wherein the controller is further configured to transmit jerk event signals upon detection of the jerk events.

7. The device of claim 6, and further comprising a transducing head configured to write data to a recordable surface, wherein the transducing head is inhibited from writing data for at least a period of time upon the transmission of at least one of the jerk event signals.

8. A device comprising:
   a controller configured to receive signals relating to disturbances applied to the device; and
   a jerk detection algorithm stored on a computer storage medium of the device and implemented by the controller, the jerk detection algorithm being configured to compare vector differentials of the received signals to at least one amplitude threshold value to detect jerk events in the sensed disturbances.

9. The device of claim 8, wherein the received signals define a signal wave, and wherein the jerk detection algorithm is further configured to determine the vector differential of a first signal and a second signal of the received signals as a difference in amplitudes between the first signal and the second signal, the first signal and the second signal being in successive phases of the signal wave.

10. The device of claim 9, wherein the first signal and the second signal are offset by an average number of generated signals per phase of the signal wave.

11. The device of claim 9, wherein the controller is further configured to transmit a jerk event signal upon detection of at least one of the jerk events.

12. The device of claim 11, and further comprising a transducing head configured to write data to a recordable surface, wherein the transducing head is inhibited from writing data for at least a period of time upon the detection of the jerk event signal.

13. The device of claim 9, wherein the controller is further configured to receive servo signals relating to servo information stored on a recordable surface, and wherein the signals relating to the disturbances are received at least once in-between successive signals of the received servo signals.

14. The device of claim 9, and further comprising at least one sensor configured to sense the disturbances applied to the device and further configured to generate the signals relating to the disturbances.

15. A method for detecting a jerk event applied to a device, the method comprising:
   receiving sampled signals relating to disturbances applied to the device, the received sampled signals defining a signal wave;
   determining a vector differential between a first signal and a second signal of the received sampled signals, the first signal and the second signal being offset by an average number of received sampled signals per phase of the signal wave; and
   comparing the vector differential to an amplitude threshold value to detect the jerk event in the disturbances applied to the device.

16. The method of claim 15, wherein determining the vector differential comprises determining a difference in amplitudes between the first signal and the second signal.

17. The method of claim 15, wherein the amplitude threshold value ranges from about a 5% change in signal amplitudes to about a 50% change in signal amplitudes.

18. The method of claim 17, wherein the amplitude threshold value ranges from about a 10% change in signal amplitudes to about a 25% change in signal amplitudes.

19. The method of claim 15, and further comprising transmitting a jerk event signal upon detection of the jerk event.

20. The method of claim 15, wherein determining the vector differential and comparing the vector differential to the amplitude threshold comprise performing a calculation that is the same as or is functionally equivalent to Amplitude($S_a$) >Amplitude($S_b$)+Threshold Value, wherein Amplitude($S_a$) is a signal amplitude of the first signal, Amplitude($S_b$) is a signal amplitude of the second signal, and Threshold Value is the amplitude threshold value.

21. A data storage device comprising:
   at least one sensor configured to sense disturbances applied to the data storage device and to generate signals based on the sensed disturbances;
   a controller configured to receive the generated signals from the at least one sensor; and
   a jerk detection algorithm stored on a computer storage medium of the data storage device and implemented by the controller, the jerk detection algorithm being configured to detect jerk events in the sensed disturbances based at least in part on vector differentials of the received signals.

22. The data storage device of claim 21, wherein the received signals define a signal wave, and wherein the jerk detection algorithm is further configured to determine the vector differential of a first signal and a second signal of the received signals as a difference in amplitudes between the first signal and the second signal, the first signal and the second signal being in successive phases of the signal wave.

* * * * *